United States Patent [19]

Miyamoto

[11] 4,264,198

[45] Apr. 28, 1981

[54] COPIER

[75] Inventor: Koichi Miyamoto, Tokyo, Japan

[73] Assignee: Canon Kabushiki Kaisha, Tokyo, Japan

[21] Appl. No.: 138,981

[22] Filed: Apr. 10, 1980

Related U.S. Application Data

[63] Continuation of Ser. No. 940,164, Sep. 7, 1978, abandoned.

[30] Foreign Application Priority Data

| | | | |
|---|---|---|---|
| Sep. 9, 1977 | [JP] | Japan | 52-107973 |
| Nov. 4, 1977 | [JP] | Japan | 52-131494 |
| Nov. 4, 1977 | [JP] | Japan | 52-131495 |
| Aug. 21, 1978 | [JP] | Japan | 53-101593 |

[51] Int. Cl.[3] ..................... G03G 15/00; G03B 27/34; G03B 27/54

[52] U.S. Cl. ........................................ 355/57; 355/11; 355/67

[58] Field of Search .................. 355/3 R, 3 SH, 8, 11, 355/14, 57, 60, 47–51, 66, 67, 71, 75

[56] References Cited

U.S. PATENT DOCUMENTS

| | | | |
|---|---|---|---|
| 2,900,869 | 8/1959 | Bjelland et al. | 355/71 X |
| 3,684,363 | 8/1972 | Ito et al. | 355/3 R |
| 3,829,209 | 8/1974 | Buddendeck et al. | 355/14 |
| 4,047,811 | 9/1977 | Allis et al. | 355/57 X |
| 4,080,062 | 3/1978 | Torigai et al. | 355/49 |
| 4,116,554 | 9/1978 | Libby et al. | 355/57 X |

*Primary Examiner*—Donald A. Griffin

*Attorney, Agent, or Firm*—Fitzpatrick, Cella, Harper & Scinto

[57] ABSTRACT

This invention discloses a copier capable of reduction and/or enlarged copying as well as real-size copying, said copier providing, along an edge of the copying sheet, a non-imaging portion of a determined width in which no image is recorded. In the real-size copying, therefore, a portion of original an corresponding to said non-imaging portion is not recorded. In the reduction or enlarged copying, however, the image of the original is formed at an area other than said non-imaging portion to obtain a copy without such incomplete image.

17 Claims, 24 Drawing Figures

COPIER

This is a continuation of application Ser. No. 940,164, filed Sept. 7, 1978, now abandoned.

BACKGROUND OF THE INVENTION

1. Field of the Invention

The present invention relates to a copier capable of reduction and/or enlarged copying (hereinafter referred to as varied-size copying) as well as real-size copying.

2. Description of the Prior Art

There is already known a copier capable of real-size copying and varied-size copying. In such known copier the rate of change in size of copying sheet is selected equal to that of the change in magnification of image. Also the switching from real-size copying to a varied-size copying is achieved, in case of a single lens, by displacing said lens along the optical axis thereof, or, in case of a zoom lens, by displacing the zooming portion thereof along the optical axis thereof. There usually accompanies a displacement of the lens in a direction perpendicular to the optical axis. This is because the supply of copy sheets of different sizes is usually achieved in such a manner that a side edge thereof always advances along the same line, so that there will result a positional aberration between the image of the original and the copying sheet unless the lens is dislaced in a direction perpendicular to the optical axis.

Also there is already known a copier which provides, along a side edge of copying sheet, a non-imaging portion of a determined width in which the image of the original is not recorded. Such non-imaging portion results from the presence of a separating means, for example a separating belt, positioned on one side between the copying sheet and a photosensitive member on which a toner image is formed, for separating said copying sheet from said photosensitive member after the image is transferred onto said copying sheet, as image transfer is not realized in a portion of a width of several to ten millimeters corresponding to the width of said separating means even if a toner image is formed in said portion. Otherwise, in case it is desirable to have a margin of a determined width along a side edge of the copying sheet, such margin or non-imaging portion can be obtained by rendering a portion of the photosensitive member corresponding to said margin insensitive to light.

Such copier providing a non-imaging portion inevitably provides, in real-size copying, an image which is incomplete along a side edge thereof. Also in varied-size copying, in such conventional copier, a similar incomplete image is obtained since the rate of change in size of copying sheet is selected equal to that of change in magnification of image. The percentage of incomplete image becomes larger as the reduction rate of the image is increased, since the size of non-imaging portion remains constant.

SUMMARY OF THE INVENTION

The object of the present invention is to provide a copier, of a type not forming an image on an end portion of a copying sheet, allowing, in a varied-size mode copying, to record the end portions of the image of an original.

The above-mentioned object is achieved, in case of a varied-size copying, by selecting the size of the image of the original substantially equal to the size of copying sheet excluding said non-imaging portion, and by positioning an end of said image substantially on the boundary line between the imaging portion and non-imaging portion.

Another object of the present invention is to provide a copier capable of determining the absolute positions of optical elements with high accuracy when changing the magnification of copying.

A still further object of the present invention is to provide a copier provided with a diaphragm means for maintaining an appropriate exposure when changing the magnification of copying.

DESCRIPTION OF THE PREFERRED EMBODIMENTS

Figure 1:
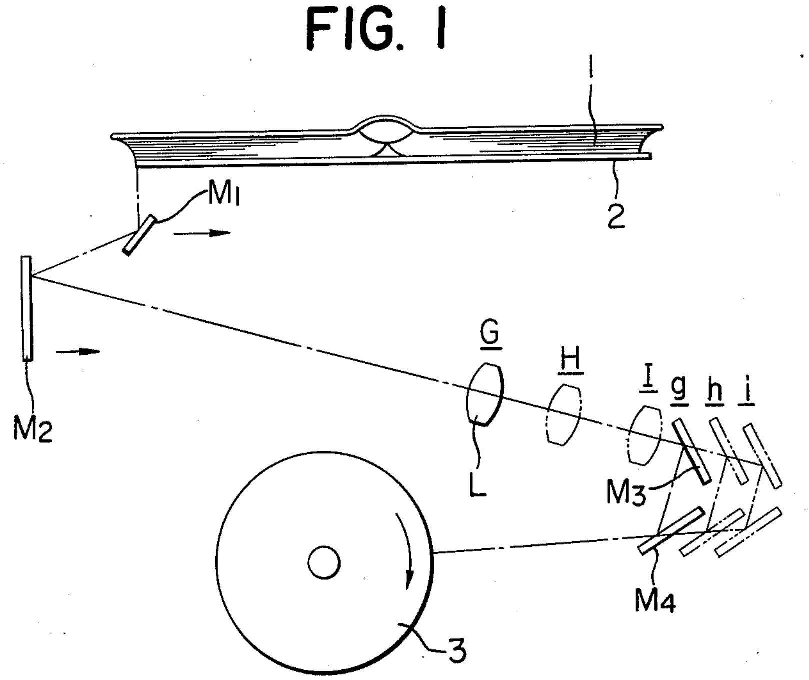
FIG. 1 is a schematic view of an optical system with a variable magnification.

The present invention will be explained in detail by the embodiments thereof shown in the attached drawings. Referring to FIG. 1, showing an example of a variable-magnification optical system adapted for use in a copier with a fixed original table and with a slit-scan exposure system, an original 1 to be copied is placed in a determined position, by means of an unrepresented positioning means, on a glass plate 2 of the original table and is illuminated from below said original. A first mirror M1 performs a scanning motion toward the right in the drawing to reflect the light from said original, which is then again reflected by a second mirror M2 moving in the same direction as said mirror M1 but at half speed and focused onto the peripheral surface of a photosensitive drum 3 through a lens L and also through third and fourth mirrors M3 and M4 of widths covering the scanning width.

In a first image magnification n1, for example 1/1, the lens L and third and fourth mirrors M3, M4 are respectively located in positions G and g, wherein:

$$1/a1+1/b1=1/f$$

$$b1/a1=n1(=1)$$

so that a1=b1=2f. Also the scanning speed of first mirror M1 is 1/n1 (=1) times the circumferential speed of the photosensitive drum 3.

In a second image magnification n2 (<n1), in order to satisfy the above equations, the lens L is displaced to a position H defined by the equation a2'=(1/n2)f while the third and fourth mirros M3, M4 are displaced to a position h corresponding to the change of total light path length (a2'+b2') to (1+n2)(1+1/n2)f.

Figure 3:
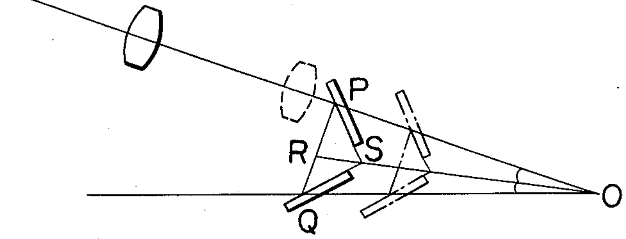
FIG. 3 is a schematic view of the displacement of optical elements.

In this case, in order to maintain the focusing position in an absolutely constant position along the axial direction of the photosensitive drum 3, it is necessary to displace the lens L in a plane containing the optical axis thereof and perpendicular to the plane of FIG. 1, and also to cause an integral parallel displacement of the third and fourth mirrors M3, M4 along a bisecting plane of the angle formed by the light beam entering the third mirror M3 and the light beam emerging from the fourth mirror M4. FIG. 3 shows the above-mentioned relationship, wherein, from the rule of reflection, ∠OPS=∠RPS, ∠OQS=∠RQS, and ∠POS=∠QOS as the point S is the inner center of a triangle ΔOPQ.

Figure 2A:
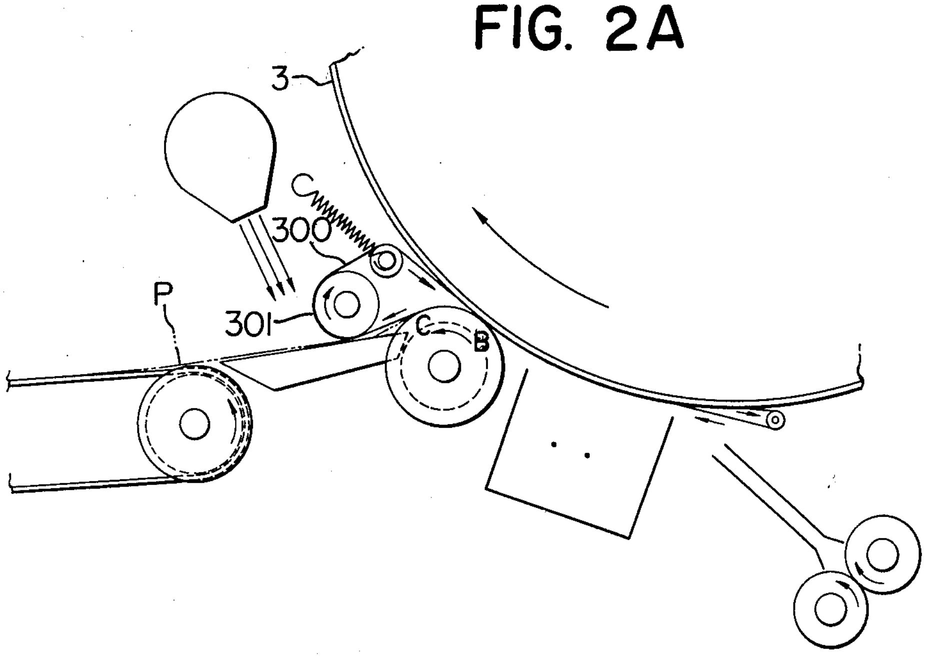
FIGS. 2A and 2B are schematic views of a separating belt.
Figure 2B:
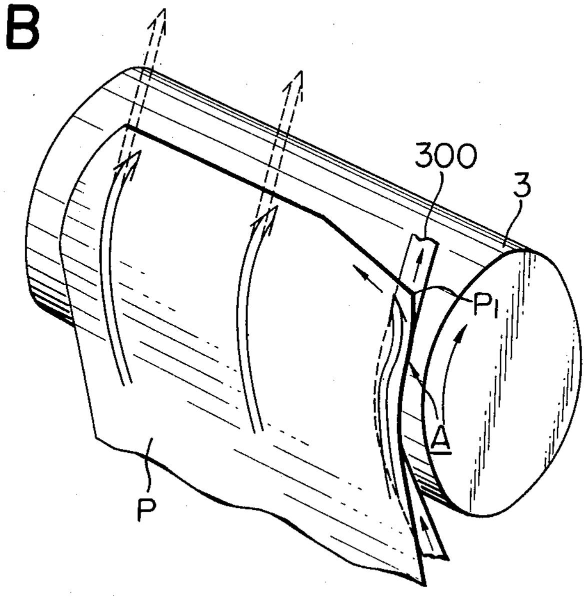

FIG. 2 shows a separating belt constituting an example of separating means for separating the copying sheet from the photosensitive drum 3. Separating method by such separating belt is featured by assured separation of copying sheet from the photosensitive drum resulting from constant presence of said belt between the sheet and drum. More specifically a separating belt 300 functions to separate a corner P1 of the leading end of copying sheet from the photosensitive drum 3 at a point A thereby initiating said separation, and to pinch thus separated corner between a separating roller 301 and said belt at a section B-C thereby pulling off the sheet from the drum and thus enlarging the separation to the entire width of copying sheet P to achieve complete separation of said sheet.

In the above-mentioned second image magnification the ratio of scanning speed of first mirror M1 and the circumferential speed of photosensitive drum 3 is to be equal to 1/n2, and this relationship is usually achieved by maintaining the circumferential speed of drum 3 equal to that first image magnification n1 while setting the scanning speed of first mirror M1 at n1/n2 times said circumferential speed in the first image magnification since it is not desirable, from the requirements of image forming process, to alter the circumferential speed of photosensitive drum 3. The above-mentioned relationship can be achieved by changing the gear linked to a drive motor for driving the mirrors M1 and M2 suitably at the change of magnification of copying.

Also in a third magnification n3, the lens L and the third and fourth mirrors M3, M4 are respectively displaced to the positions I, i while the first mirror M1 performs scanning motion at speed n1/n3 times the circumferential speed of said photosensitive drum 3.

Figure 4:
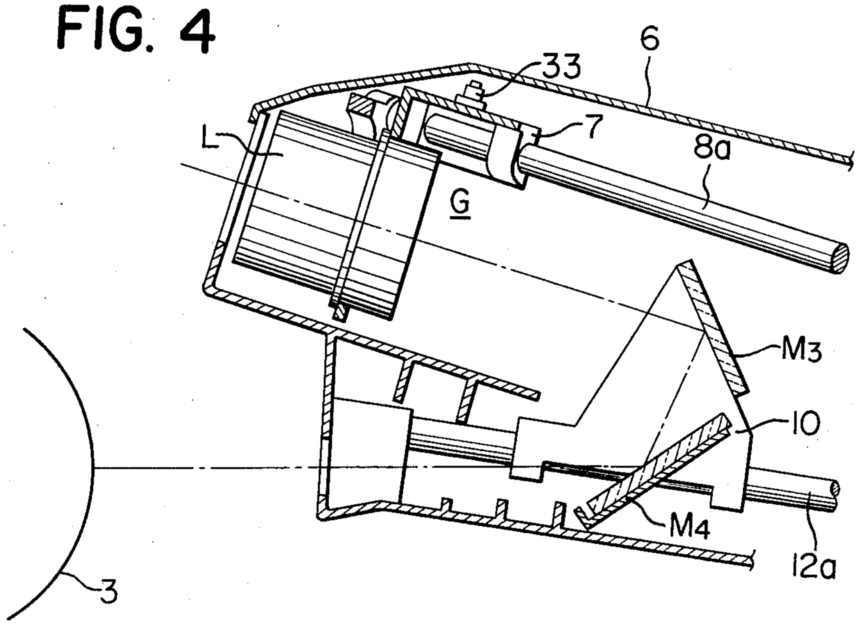
FIG. 4 is a lateral view showing the arrangement of optical elements.
Figure 5:
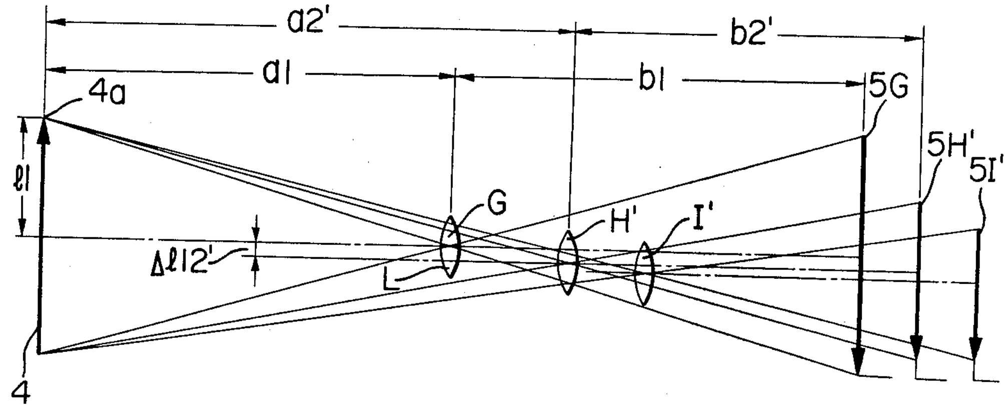
FIG. 5 is an extended view of the light path of a variable-magnification optical system adapted for use in the copier of the present invention.
Figure 7:
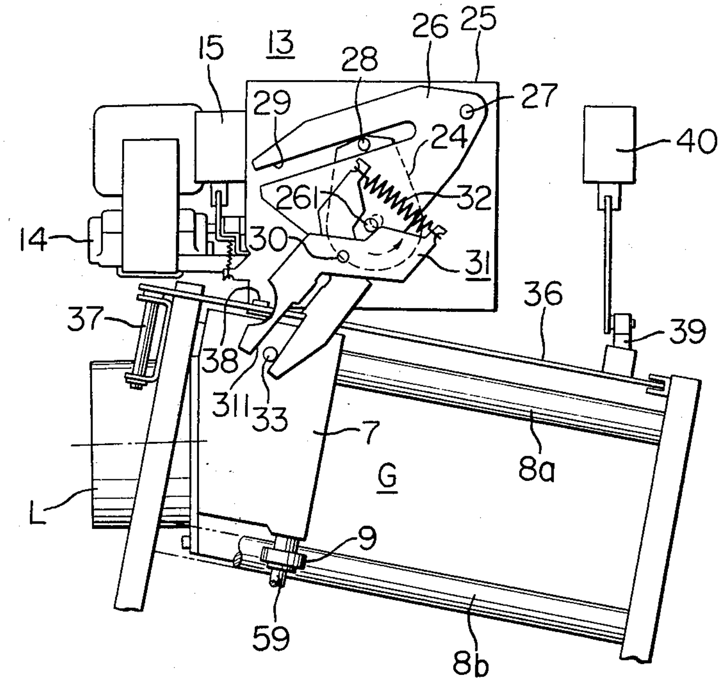
FIGS. 7, 8 and 9 are plan views showing the state of displacement of the lens.

FIG. 4 shows an embodiment of the optical system wherein 6 is an optical box fixed in the copier and movably comprising the lens L and the third and fourth mirrors M3, M4, the positions thereof corresponding to the positions, G, g for the aforementioned first magnification. As shown in FIGS. 4 and 7, the lens L is mounted on a support 7 slidably supported on two guide rails 8*a*, 8*b* extending in the lens displacing direction, simultaneously allowing displacement thereof in a direction perpendicular to the optical axis. In the illustrated example one side of the upper portion of said support 7 is slidably fitted on the guide rail 8*a* through a slide bushing (now shown) while the other side of said upper portion is supported, by means of a roller 9 provided thereon, on the other guide rail 8*b*. The displacing direction of lens L is as shown in FIG. 5 and forms a certain angle with respect to the optical axis thereof. Stated differently, the guide rails 8*a*, 8*b* are provided in an inclined relationship with respect to the optical axis.

The third and fourth mirrors M3, M4 are mounted on a support 10 which is supported, by means of a slide bushing and a roller 11 in a similar manner as for the lens support 7, slidably on two guide rails 12*a*, 12*b* provided on the aforementioned optical box. Said guide rails 12, 12*b* are provided parallel to the optical axis when seen from the original supporting glass plate 2. The mirrors M3, M4 are naturally of a dimension sufficient to cover the effective light beam varying with the displacement of lens L. In case the lens L is a zoom lens, the mirrors M3, M4 need not be displaced, and it suffices to displace the variable-magnification group of said zoom lens in a direction perpendicular to the optical axis in the above-mentioned manner.

FIG. 5 shows the shift in longitudinal direction thereof, while FIG. 6 shows the relation between the copied image and the copying sheet in various magnifications. Conventionally a standard end 4*a* of the original is focused, in all the magnifications, on a side end E of the photosensitive member, so that the ratio of image incompletiness resulting from the non-imaging portion of a width W increases at a lower copying magnification and is equal to W/n at a magnification n.

Figure 6A:
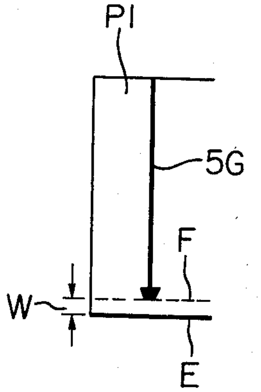
FIGS. 6A, 6B, 6C and 6D are schematic views showing the relationship between the reproduced image and copying sheet.
Figure 6B:
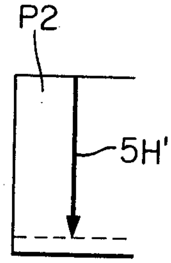
Figure 6C:
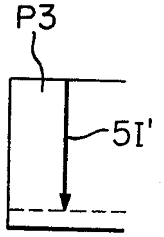

According to the present invention, in the real-size copying the original image 4 is focused by the lens L located in the position G onto a determined position E on the drum as shown in FIG. 6*a* while in a varied-size copying the lens L is displaced to a position H' or I' in such a manner that the original image 4 is focused not in said non-imaging portion but in the position 5H' or 5I' with said standard end of original being focused substantially on the boundary line F between said non-imaging portion and the imaging portion as shown in FIG. 6*b* or 6*c*.

Figure 6D:
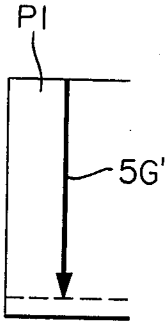

A portion corresponding to the width for example of a separating belt for separating the copying paper from the photosensitive drum does not form an image, so that, in the real-size copying, the reproduced image inevitably lacks a portion of said width W at said standard end of the original. In this case, if the standard end is focused, as shown in FIG. 6*d'*, in the vicinity of the boundary between the non-imaging portion and imaging portion of the photosensitive drum in a similar manner as in the image position 5H' or 5I', the resulting image will lack a portion of width W on an end opposite to said standard end. Naturally in this case the displacement is performed in the order shown in FIGS. 6*d'*, 6*b* and 6*c* so that the amounts of axial and perpendicular displacements of optical elements are different from the above-explained case shown in FIGS. 6*a*, 6*b* and 6*c*. Both in FIG. 6*a* and FIG. 6*d'* the reproduced image in real-size copying lacks a portion, of a width W, of the original image, but such partial lack is not practically important since real-size copying has a practical advantage for example of direct reading of dimension from the copy and also since the original usually has a margin at the end portion thereof.

On the other hand, in a varied-size copying, it is more important to have a complete reproduced image than to have an exact magnification, so that the lens L is displaced in a direction perpendicular to the optical axis as well as in the axial direction so as to focus the image of original outside said non-imaging portion. When the magnification is changed from n1 to n2, the lens L is axially displaced toward the drum 3 by a distance a2'−a1, or (1/n2−1/n1)f. Also in order to position said standard end of image not in the non-imaging portion but on the boundary between the imaging portion and non-imaging portion, the lens L has to be displaced in a direction perpendicular to the optical axis by a distance Δl12', or {(n1−n2)l1−W}/(1+n2), wherein l1 is the distance between the optical axis position and the standard end at a magnification n1. The inclination of the guide rails 8*a*, 8*b* for the lens L with respect to the optical axis thereof is, for a change in magnification from n1 to n2:

$$\theta_{12} = \tan^{-1}\frac{(n1 - n2)l1 - W}{(1 + n2)(1/n2 - 1/n1)f}$$

Also the inclination for a change of magnification from n1 to n3 is:

$$\theta_{13} = \tan^{-1}\frac{(n1 - n3)l1 - W}{(1 - n3)(1/n3 - 1/n1)f}.$$

Although θ12 is generally not equal to θ13, these two angles are substantially mutually equal in the present embodiment so that the angle θ12, if employed in place of θ13 for a magnification change from n1 to n3, will merely result in a slight displacement ΔW, smaller than 0.5 mm, of the focused position of said standard end from that in a magnification n2. Consequently the guide rails 8*a*, 8*b* for guiding the lens can be made linear without practical inconvenience.

According to the present invention, as explained in the foregoing, the copying sheets of different sizes, regardless of the sizes thereof, are positioned, in feeding, with a side edge thereof parallel to the advancing direction being always aligned with a fixed position in order to achieve separation from the photosensitive drum, and still image lack in the varied-size copying can be prevented without displacing the paper feeding mechanism utilizing the separating belt.

In the following there is shown a schematic flow chart of the copying operation:

*Copying magnification selecting switch*
*Copy switch*
*Displacement of optical system*
*Optical system stop signal*
*Drum rotation*
*Drum synchronizing signal*
*Slit scanning start*
*Slit scanning synchronizing signal*
*Paper feeding*

In the following there will be given detailed explanations of the mechanisms for lens displacement, for stopping and position defining of lens, for third and fourth mirrors, and for exposure adjustment.

(1) Mechanism for lens displacement (FIGS. 7 to 10):

The lens displacing mechanism 13 is provided on a side of the guide rail 8*a* and is driven by a one-direction motor 14 of which driving force is transmitted, through a spring clutch 16 controlled by a solenoid 15, to a shaft 18 rotatably supported in a gear box 17. Said spring clutch 16 is provided to cut off excessive inertial rotation of said motor 14. Said shaft 18 is provided with a worm gear 19 meshing with a worm wheel 20 linked with a series of reducing gears 21 mounted on a fixed shaft 22 and a rotary shaft 23 supported in the gear box 17, the last gear 211 of said serial reducing gears 21 being fixed to said rotary shaft 23 thereby transmitting the driving force of said motor 14 to the shaft 23.

On the upper end of said rotary shaft 23 there is fixed a crank 24, and there is provided, facing thereto, an arm 26 rotatably supported by a shaft 27 provided on a base plate 25 of the lens displacing mechanism 13. The abovementioned crank 24 is provided, on the end portion thereof, with a roller 28 which slidably engages in an oblong groove-shaped notch 29 provided in said arm 26. Said arm 26 is provided, at the end portion thereof, with a scissor-shaped lens displacing members 31 which are articulated to said arm 26 by means of a shaft 30, a traction coil spring 32 being provided between the base portions of said scissor-shaped member so as to apply a biasing force to close the tip of said scissors. The inner face of tip portion of either one of said lens advancing members 31 engages with a roller 33 provided on the upper surface of lens support. 261 is a pin provided for limiting the rotation of said members 31.

Figure 8:
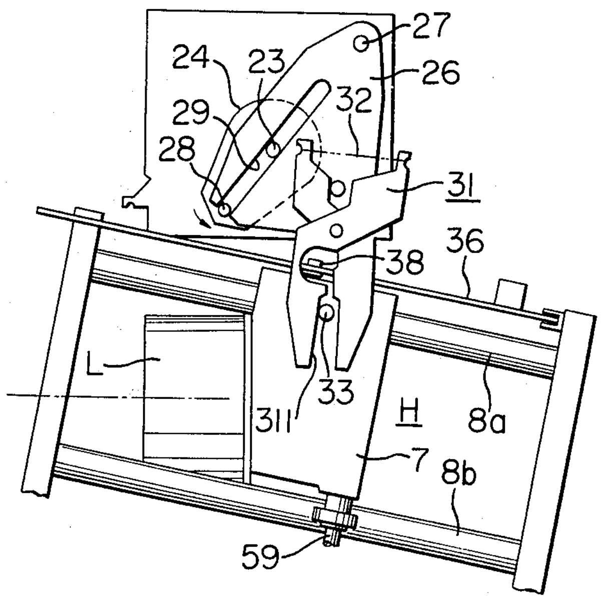
Figure 9:
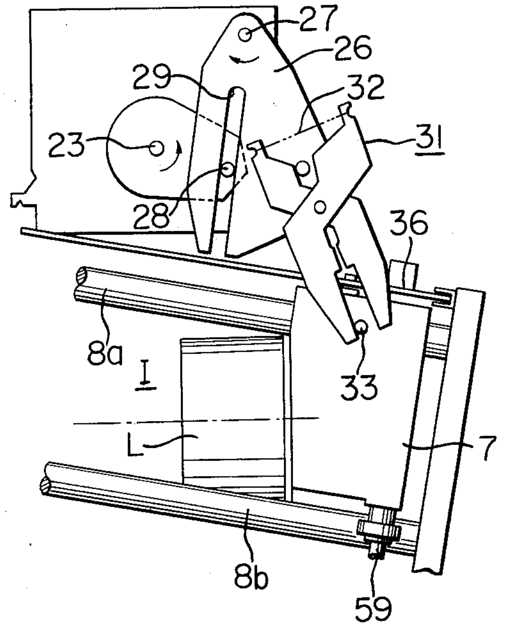

In the above-explained structure, when the shaft 23 is rotated by means of motor 14 through the spring clutch 16 controlled by the solenoid 15, worm gears 19, 20, and reducing gears 21, the crank 24 performs a rotation in the counterclockwise direction as shown in FIG. 7, whereby the arm 26 is rotated counterclockwise through the engagement of roller 28 and grooved notch 29. Thus a tip portion 311 of said lens displacing members 31 presses said roller 33 provided on the lens support, whereby the lens L performs a forward displacement along the guide rails 8*a*, 8*b*, from a position shown in FIG. 7 (position G in FIG. 1) to a position shown in FIG. 8 (position H in FIG. 1) and further to a position shown in FIG. 9 (position I in FIG. 1), and then performs a reversing displacement in the inverted order by the continuing rotation of crank 24. It is to be noted that FIGS. 7, 8 and 9 show the states of the lens after it is stopped at a position 36G, 36H or 36I, respectively. During the displacement the pin 261 is in a pinched state by means of coil spring 32. Although said pin 261 is of a diameter equal to that of roller 33, there results a certain play between the roller 33 and the tip portions of lens displacing members 31 because of a difference in distances from the fulcrum 30.

The lens can be stopped at positions corresponding to various magnifications, by means of a stop-position defining mechanism to be explained later, in the order of G→H→I→G . . . , and the stopping at the position H corresponding to the second magnification can be achieved only during the forward displacement of the lens.

Figure 10:
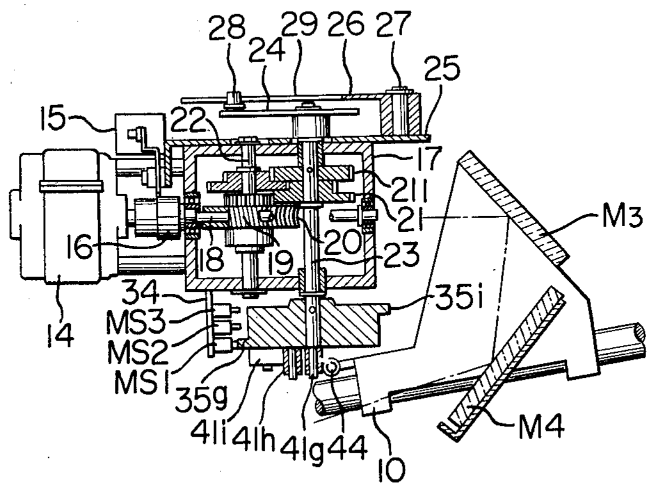
FIG. 10 is a vertical cross-sectional view of a power transmission.

(2) Mechanism for stopping and position defining of lens (FIGS. 10 to 15):

As shown in FIG. 10 a bracket 34 provided under said gear box 17 is provided with three microswitches MS1–MS3, and the aforementioned shaft 23 is provided at the lower end thereof, with a cam plate 35 (FIG. 15) provided on the periphery thereof with cam portions 35*g*–35*i* for successively actuating said microswitches. Each of said microswitches is actuated by said cam plate 35 upon lapse of a determined time after the arrival of lens L at one of the positions G to I corresponding to various magnifications thereby deactivating the solenoid 15 controlling the spring clutch 16 and interrupting power supply to the motor 14.

Figure 11:
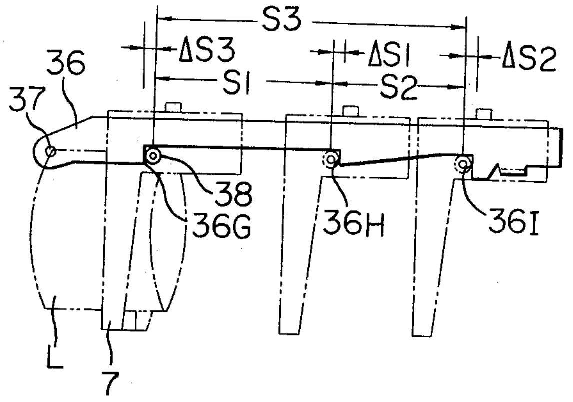
FIG. 11 is a lateral view showing the relationship between the lens and a stopping plate therefor.

Also as shown in FIG. 11 there is provided a stopping plate 36, for stopping the lens L in said positions G to I, along the guide rail 8*a* and rotatable about an axis 37 provided on the optical box 6, said stopping plate 36 being provided, on the lower surface thereof, with shouldered portions 36G–36I corresponding respectively to the above-mentioned lens positions G–I whereby a roller 38 provided on a side of lens support 7 engages with said stopping plate 36 between the shoulders 36G and 36I.

The stroke S1 of roller 38 between the shoulders 36G and 36H, is selected shorter by a length ΔS1 than the stroke obtained by the driving mechanism between 35*g* and 35*h*, so that the motor 14 etc. are stopped upon lapse of a period corresponding to said ΔS1 after the engagement of roller 38 with the shoulder 36H. Similarly the stroke S2 between the shoulders 36H and 36I, and the stroke S3 between the shoulders 36I and 36G are selected shorter, respectively by lengths ΔS2 and ΔS3, than the strokes obtainable by the driving mechanism.

In case of displacing the lens L from the position G to H in the above-mentioned structure, upon displacement of lens support 7 to the right in FIG. 11 by means of said lens displacing mechanism, the roller 38 leaves the shoulder 36G of stopping plate 36 and glides along the lower surface thereof until it reaches the shoulder 36H. As the lens displacing mechanism is still in a driven state as explained in the foregoing despite that the lens support 7 is already stopped by the stopping plate 36, the roller 38 is strongly pressed against the shoulder 36H and simultaneously the traction coil spring 32 of the member 31 is stretched to absorb the stroke difference ΔS1, whereby the cam portion 35*h* of cam plate 35 (FIG. 15) comes into contact with the microswitch MS2 to stop the motor 14 while the lens support is maintained in pressure contact with the stop position.

Figure 12:
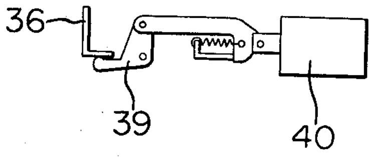
FIG. 12 is a partial view of a stopping plate lifting mechanism.

Also in case of displacing the lens L from the position H to I, a solenoid 40 as shown in FIGS. 7 and 12 is energized to actuate a lever 39 contacting with the lower surface of the stopping plate 36 thereby lifting the end portion thereof thus to release the engagement between the roller 38 and shoulder 36H. The above-mentioned disengagement is also performed in case of displacement of the lens L from the position G directly to I. On the other hand, in case of the displacement of lens L from the position I to G there is no difficulty in the gliding of roller 38 since the stopping plate 36 of which lower surface is inclined downward in the direction from I to G is pushed up by the roller 38 upon passing the position H.

Also in the positions G, I of the lens L the roller 38 engages with the shoulder 36G or 36I of the stopping plate 36 and maintained in strong pressure contact state. In the displacement of the lens L from a position to another either one of the microswitches MS1–MS3 is actuated, but the electric circuit is constructed in such a manner that the motor can be driven independently from the microswitches in this case.

As explained in the foregoing, after the engagement of the roller 38 with a shoulder 36G, 36H or 36I, the traction coil spring 32 of the member 31 is stretched to absorb the stroke difference Δ1, Δ2 or Δ3 thereby generating a force or a direction inversely rotating the motor 14 through the gears 21. However said force is not transmitted to the motor 14 by the self-locking mechanism of the worm gears 19, 20 so that the pressure of roller 38 against the shoulder 36G, 36H or 36I remains constant. Also said force functions to apply a pressure to said gears 21, thus preventing the plays therebetween.

In the above-explained structure the stop timing of lens displacing mechanism is not critical but may be selected within the period ΔS, so that the fine adjustment of microswitches can be dispensed with and the presence of certain overrun does not cause any practical trouble.

The displacing speed of roller 38 has to be small when it collides the shoulders 36G–36I. In the present embodiment, this requirement is achieved in the following manner.

Figure 13:
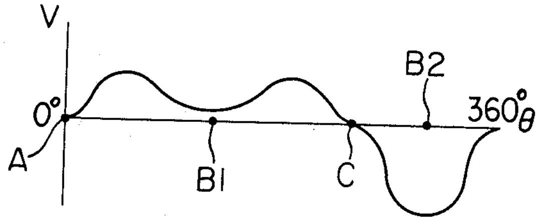
FIG. 13 is a chart showing the displacing speed of the lens.
Figure 14:
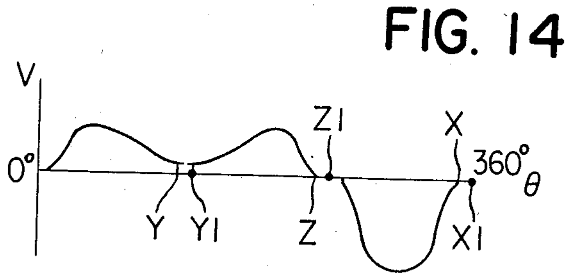
FIG. 14 is a chart showing the functioning points of the stopping plate and microswitches along the lens displacement as shown in FIG. 13.

FIGS. 13 and 14 show the relationship between the rotation angle θ of the shaft 23 and the displacing speed V of lens support 7, wherein FIG. 13 shows a case where the stopping plate 36 does not come into engagement with the roller 38 while FIG. 14 shows a case where the stopping plate 36 engages with the roller 38. In FIG. 13 the displacing speed of lens support 7 is zero at the point A or C as these points correspond to the end points of reciprocating stroke of the lens support where the crank 24 is at a dead point. Also around a point B1 in the middle of said stroke, the speed of lens support 7 is relatively small because of the length ratio of lever. On the other hand, in the reversing displacement the speed of lens support 7 at the middle point B2 is larger to achieve a quick reversing as the crank 24 passes a position of arm 26 closer to the shaft 27.

With respect to the lens support 7 of the above-explained displacing characteristic, the roller 38 comes into engagement with the shoulders 36G–36I of stopping plate 36 at the points X–Z shown in FIG. 14, and the microswitches MS1–MS3 are respectively actuated at the points X1–Z1. In either case the roller 38 collides with said shoulders with a small displacing speed and thus with a reduced shock, thereby satisfying the above-mentioned requirement. The dotted line Y–Y1 in FIG. 14 shows the case of direct displacement of the lens L from the position G to I without intermediate stop at the position H.

Figure 15:
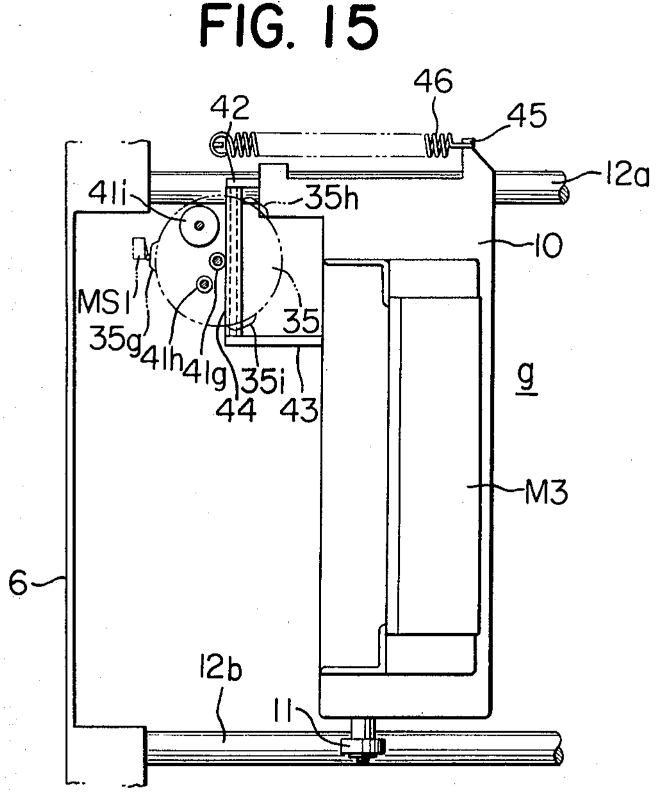
FIGS. 15, 16 and 17 are plan views showing the displacement of mirrors.
Figure 16:
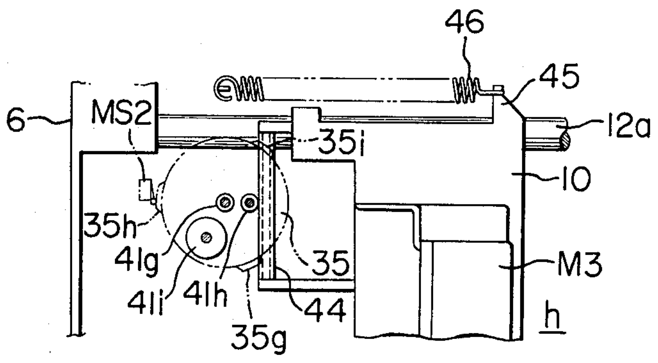
Figure 17:
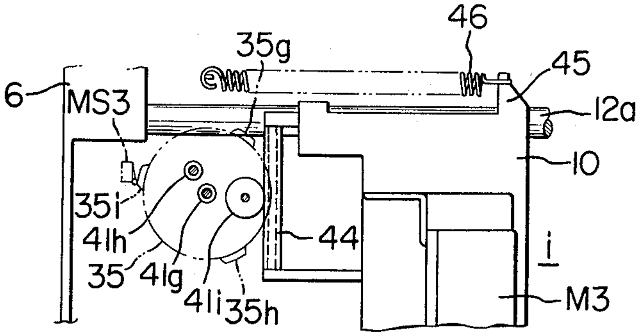

(3) Mechanism for displacing third and fourth mirrors (FIG. 10; FIGS. 15–17):

As shown in FIGS. 10 and 15, the cam plate 35 fixed on the shaft 23 is provided, on the lower surface thereof, with three rollers 41*g*–41*i*, of which a roller 41*g* is provided concentric with said shaft 23. The mirror support 10 is provided with a collar 44 supported by brackets 42, 43 in such a position that said collar comes into contact successively with the peripheries of said rollers 41*g*–41*i* when said cam plate 35 is rotated. Also said mirror support 10 is constantly biased to the left in FIG. 15 by means of a traction coil spring 46 provided between a hook 45 on a side of said mirror support and the optical box 6 whereby said collar 44 is maintained in constant contact with either one of said rollers 41*g*–41*i*.

Said rollers 41*g*–41*i* are provided on the cam plate 35 with respect to the cam portions 35*g*–35*i* thereof in such a manner that the cam portion 35*g* actuate the microswitch MS1 to place the third and fourth mirrors M3, M4 in the position g in FIG. 1 when the roller 41*g* is in contact with the collar 44, that upon rotation of cam plate 35 the roller 41*h* comes into contact with the collar 44 to displace the mirror support 10 to the right in FIG. 13 against the function of traction coil spring 46 and that upon arrival of roller 41*h* at the dead point as shown in FIG. 16 the cam portion 35*h* actuates the microswitch MS2 to place the third and fourth mirrors M3, M4 in the position h in FIG. 1. Also the positional relationship between the roller 41*i* and cam portion 35*i* is determined in a similar manner as for the position h explained above (FIG. 17).

As the position of mirror support 10 is determined by the stationary position of roller 41*g* or dead points of rollers 41*h*, 41*i* as explained above, the stop timing or eventual overrun of motor 14 is not a serious problem. For example in case of a magnification n2 (FIG. 16) with a reducing ratio of 1/100 from the motor 14 to the shaft 23, an eventual overrun of 1080° or 3 full turns of motor 14 will merely result in a positional error $\Delta r$ with respect to the correct distance r:

$$\Delta r=\{1-\cos(1080/300)\}r\approx 0.002\ r$$

said error being very small and thus negligible.

(4) mechanism for exposure adjustment (FIGS. 18–20):

The above-mentioned lens L is provided internally with a diaphragm for adjusting the exposure corresponding to the change in image magnification.

Figure 18:
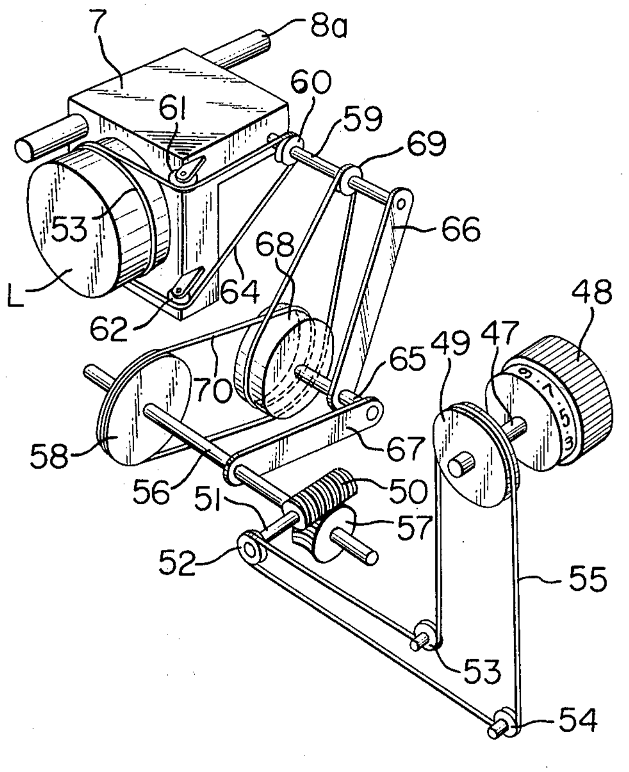
FIG. 18 is a perspective view of an exposure control mechanism.

The mechanism for said disphragm control is schematically shown in FIG. 18.

On the front control panel of the copier there is provided a diaphragm control dial 48 fixed on a shaft 47 which coaxially holds a first pulley 49. A string 55 is provided in L-shape between said pulley 49 and a second pulley 52 fixed on a shaft 51 holding a worm gear 50 through intermediate pulleys 53, 54. Said worm gear 50 meshes with a worm wheel 57 mounted on a shaft 56 which holds, on the other end thereof, a third pulley 58.

The above-mentioned elements are provided in the copier and do not change positions thereof even when the lens L is displaced.

The lens support 7 is provided with a rotary shaft 59 parallel to said shaft 56, said shaft 59 being provided on a base portion thereof with a fourth pulley 60 around which a string 64 is provided to link said pulley 60 with a diaphragm control portion 63 through intermediate pulleys 61, 62. Two articulated links 66, 67 are provided respectively between the end portion of said rotary shaft 59 and a movable shaft 65 provided thereunder and between said shaft 65 and the shaft 56, said links being parallel to the lens displacing guide rails 8*a*, 8*b*. The shaft 65 rotatably holds a fifth pulley 68 of a diameter equal to that of said third pulley 58 while the rotary shaft 59 is provided thereon with a sixth pulley 69 smaller than said pulley 68 (same diameter as that of fourth pulley 60), and a string 70 is provided between said third, fifth and sixth pulleys 58, 68, 69.

In the above-explained structure a rotation of diaphragm control dial 48 is transmitted to the diaphragm control member 63 through said pulleys and strings to achieve desired exposure control. The control dial is not affected by the displacement of lens L to an another position as the fifth pulley 68 circularly moves around the shaft 56. Said control dial is provided for allowing the user to independently determine the copy density and usually has an adjustable range wider than the range for automatic adjustment to be explained in the following.

The automatic adjustment of exposure corresponding to a change in copying magnification is achieved by the mechanism between the third pulley 58 and sixth pulley 69, said automatic adjustment being conducted to maintain the copy density before said magnification change.

Figure 20:
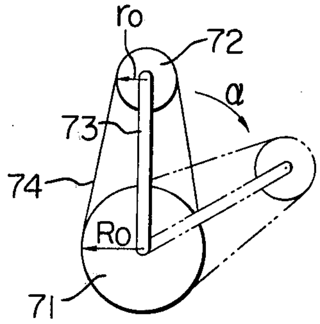
FIG. 20 is a schematic view showing the principle applied in the pulley displacing mechanism shown in FIG. 19.

FIG. 20 shows the working principle of said adjustment mechanism employed in the present embodiment, wherein a pulley 71 of a radius $R_o$ and an another pulley 72 of a radius $r_o$ ($R_o>r_o$) are connected by an articulated link 73, and a string 74 is provided around said pulleys 71, 72. When the pulley 72 is displaced from the full-lined position to the chain-lined position by an angle $\alpha$ while the pulley 71 is maintained stationary, the pulley 72 rotates in the direction of arrow by the difference in radii of said pulleys as the string 74 is not displaced. The amount of said rotation of pulley 72 is $(R-r)\alpha/r$ when measured in a coordinate system fixed on the pulley 71. Thus no rotation is obtained when R is equal to r.

Figure 19:
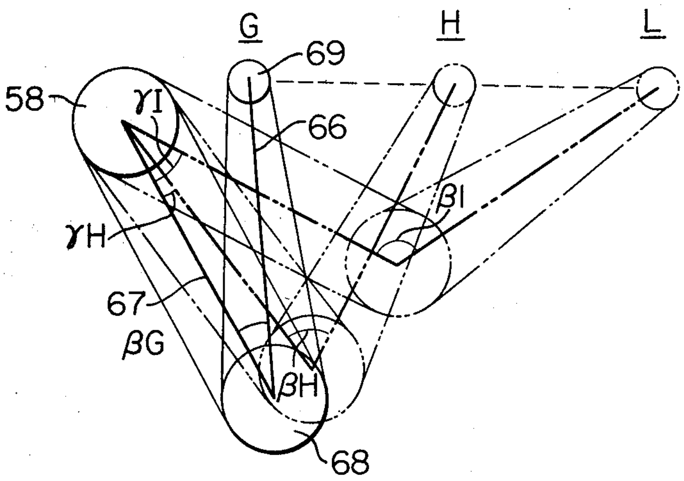
FIG. 19 is a schematic view showing the displacement of pulleys at the change of copying magnification.

In FIG. 19 there is shown the movement of the third, fifth and sixth pulleys 58, 68, 69 and of the links 66, 67 of the present embodiment wherein the above-explained principle is applied.

The positions G, H and I of sixth pulley 69 correspond to respective positions of lens L. Assuming that the angle between the links 66 and 77 is $\beta$ and the angular change of position of link 67 is $\gamma$ taking the position G as the standard, the angle corresponding to the angle $\alpha$ in FIG. 20 can be represented as follows:

for position H $\alpha_H=\beta_H-\beta_G-\gamma_H$ for position I $\alpha_H=\beta_H-\beta_G-\gamma_H$ said angles $\alpha_H$ and $\alpha_I$ causing rotation of sixth pulley 69 thereby varying the disphragm opening of lens L. The amount of rotation of said sixth pulley 69, or the amount of exposure adjustment, is suitably determined by the lengths of links 66, 67 and the diameters of third, fifth and sixth pulleys 58, 68, 69.

The setting of diaphragm control dial 48 is aberrated if the rotation of sixth pulley 69 etc. is inversely transmitted to said dial, but in the present embodiment such inverse transmission is hindered by the presence of worm gear 50 and worm wheel 57.

In the foregoing embodiment, the use of mechanical means for positioning of lens and mirrors in the axial and perpendicular directions at the real-size and varied-size copying provides following advantages:

(1) The positional accuracy of lens etc. can be determined solely by the working and assembling precision of component parts and is well reproducible without delicate adjustment;

(2) Microswitches do not require particular adjustment and eventual errors in the function thereof can be tolerated as the positioning of lens etc. does not depend directly on the microswitches;

(3) Eventual overrun of displacing parts, even when considerably large, can be tolerated;

(4) Use of worm gears between the motor and reducing gears prevents, by the self-locking function thereof, formation of play in the series of reducing gears, and also prevents rotation of motor by external force;

(5) Motor rotating in one direction does not require a forward-reverse control circuit indispensable for a reversible motor;

(6) Excellent durability is assured since the displacing mechanisms for lens etc. all depend on rotational mechanisms;

(7) Automatic exposure adjustment is possible simultaneously with the change in copying magnification even in a copier providing three or more copying magnifications;

(8) A manual exposure control is possible by the exposure control dial regardless of the position of lens as said dial is constantly linked with the lens diaphragm;

(9) Rotation of lens diaphragm resulting from a change in copying magnification does not cause undesirable rotation of diaphragm control dial since the movement is transmitted from said dial to the diaphgram but not in the opposite direction because of the presence of a worm gear and a worm wheel.

As detailedly explained in the foregoing, the present invention has solved various drawbacks in the conventional apparatus and to obtain has obtained an improved accuracy with a simple structure.

Also it will be readily understood that the displacing and stopping mechanism for the lens and the displacing mechanism for mirrors may be employed singly or may be employed also in an inverted combination. Furthermore the present invention provides a copier allowing secure correction of exposure with a simple structure.

What I claim is:

1. A copier comprising:

original support means provided with a positioning standard end on one side end thereof;

a photosensitive member provided, irrespective of the imaging magnification ratio, with a non-imaging portion which extends in the moving direction thereof, said portion having a predetermined width extending inwardly from a side end corresponding to said positioning standard end, said member also having an imaging portion;

paper feed means for feeding copying sheets to said photosensitive member, said copying sheets being fed in such a manner that one side end thereof always corresponds to said non-imaging portion of said photosensitive member;

optical means comprising a focusing element displaceable by predetermined amounts in the axial direction and in a direction perpendicular thereto for selectively focusing a real-size image and a varied-size image on said photosensitive member, wherein during real-size imaging, the image of said positioning standard end is directed to said side end of said photosensitive member, and during varied-size imaging the image thereof is shifted inwardly from said side end of said photosensitive member; and displacing means for displacing at least a portion of said optical means in the axial direction thereof and in a direction perpendicular thereto.

2. A copier comprising:

an original support means provided with a positioning standard end on one side end thereof;

a photosensitive member provided, irrespective of the imaging magnification ratio, with a non-imaging portion which extends in the moving direction thereof, said portion having a predetermined width extending inwardly from a side end corresponding to said positioning standard end, said member also having an imaging portion;

a paper feed means for feeding copying sheets to said photosensitive member, said copying sheets being fed in such a manner that one side end thereof always corresponds to said non-imaging portion of said photosensitive member;

a separating means provided in said non-imaging portion of said photosensitive member and constantly between a fed copying sheet and said photosensitive member for separating the copying sheet from said photosensitive member;

optical means comprising a focusing element displaceable by predetermined amounts in the axial direction and in a direction perpendicular thereto for selectively focusing a real-size image and a varied-size image on said photosensitive member, wherein during real-size imaging, the image of said positioning standard end is directed to the side end of said photosensitive member, and during the varied-size imaging, the image thereof is shifted inwardly from said side end of said photosensitive member; and displacing means for displacing at least a portion of said optical means in the axial direction thereof and in a direction perpendicular thereto.

3. A copier according to claim 2 wherein said separating means is a separating belt.

4. A copier comprising:

original support means provided with a positioning standard end on one side end thereof;

a photosensitive member provided, irrespective of the image magnification ratio, with a non-imaging portion which extends in the moving direction thereof, said portion having a finite width extending inwardly from a side end corresponding to said positioning standard end, said member also having an imaging portion;

paper feed means for feeding copying sheets to said photosensitive member, said copying sheets being fed in such a manner that one side end thereof always corresponds to said non-imaging portion of said photosensitive member;

separating means provided in said non-imaging portion of said photosensitive member and constantly between a fed copying sheet and said photosensitive member for separating the copying sheet from said photosensitive member;

optical means comprising a focusing element displaceable by predetermined amounts in the axial direction and in a direction perpendicular thereto for selectively focusing a real-size image and a varied-size image on said photosensitive member, wherein during real-size imaging, the image of said positioning standard end is directed to said side end of said photosensitive member, and during varied-size imaging the image thereof is shifted inwardly from said side end of said photosensitive member;

displacing means for displacing at least a portion of said optical means in the axial direction thereof and in a direction perpendicular thereto;

stopping means for terminating the displacement of said optical elements; and switch means for deactivating said displacing means upon the lapse of a predetermined time after the displacement of said optical means is stopped by said stopping means.

5. A copier according to claim 4 further comprising a means for releasing said stopping means.

6. A copier according to claim 4, wherein said displacing means is prevented from moving backwardly by the self-locking between a worm gear and a worm wheel, after said displacing means is stopped by said stopping means.

7. A copier according to claim 4, wherein said stopping means, upon the reciprocating movement of said optical means, operates in only one direction of the reciprocation, and said switch means comprises a rotary member performing a full rotation in one direction corresponding to a reciprocating movement of said optical means, said rotary member being adapted to release a displacement stopping signal during one rotation corresponding to each copying magnification.

8. A copier comprising:

original support means provided with a positioning standard end on one side end thereof;

a photosensitive member provided, irrespective of the imaging magnification ratio, with a non-imaging portion provided in the moving direction thereof with a predetermined width extending inwardly from a side end corresponding to said positioning standard end, said member also having an imaging portion;

optical means comprising a focusing element displaceable by predetermined amounts in the axial direction and in a direction perpendicular thereto for selectively focusing a real-size image and a varied-size image on said photosensitive member, wherein during real-size imaging, the image of said positioning standard end is directed to said side end of said photosensitive member and during varied-size imaging the image thereof is shifted inwardly from said side end;

displacing means for displacing at least a portion of said optical means in the axial direction and in a direction perpendicular thereto;

an exposure control mechanism for said focusing element and movable integrally therewith;

a control mechanism consisting of a movable portion connected for movement with the displacement of said focusing element and a fixed portion independent of said displacement, said mechanism being adapted to automatically control said exposure control mechanism in cooperation with the displacement of said movable portion in accordance with the change of the image magnification ratio; and an exposure adjusting mechanism for controlling, by manual operation from outside, said exposure control mechanism through said control mechanism thereby manually controlling the amount of light supplied to said focusing element.

9. A copier according to claim 8 wherein said control mechanism comprises a movable pulley provided in said movable portion and adapted for controlling said exposure control mechanism, a fixed pulley provided in said fixed portion, a floating pulley having a different diameter from at least one of said movable pulley and fixed pulley and provided between said two pulleys and an endless string provided around said pulleys, said movable pulley being rotated by the displacement of said movable portion whereby the exposure control mechanism automatically controls the amount of light supplied to said focusing element.

10. A copier according to claim 8 wherein said control mechanism comprises a member transmitting a drive power from said exposure adjusting mechanism to said exposure control mechanism but not in the opposite direction by the self-locking of a worm gear and a worm wheel.

11. A copier comprising:

original support means provided with a positioning standard end on one side end thereof;

a photosensitive member provided, irrespective of the imaging magnification ratio, with a non-imaging portion provided in the moving direction thereof with a predetermined width extending inwardly from a side end corresponding to said positioning standard end, said member also having an imaging portion;

optical means comprising a focusing element displaceable by predetermined amounts in the axial direction and in a direction perpendicular thereto for selectively focusing a real-size image and a varied-size image on said photosensitive member, wherein during real-size imaging the image of said positioning standard end is directed to said side end of said photosensitive member and during varied-size imaging the image thereof is shifted inwardly from said side end;

displacing means for displacing at least a portion of said optical means in the axial direction and in a direction perpendicular thereto;

stopping means for terminating the displacement of said optical means;

switch means for deactivating said displacing means upon the lapse of a predetermined time after displacement of said optical means is stopped by said stopping means;

an exposure control mechanism for said focusing element and movable integrally therewith; and a control mechanism consisting of a movable portion connected for movement with the displacement of said focusing element and a fixed portion independent of said displacement, said mechanism being adapted to automatically control said exposure control mechanism in cooperation with the displacement of said movable portion in accordance with the change of the image magnification ratio.

12. A copier comprising:

original support means provided with a positioning standard end on one side end thereof;

a photosensitive member provided, irrespective of the imaging magnification ratio, with a non-imaging portion provided in the moving direction thereof with a finite width extending inwardly from a side end corresponding to said positioning standard end, said member also having an imaging portion;

optical means comprising a focusing element displaceable by predetermined amounts in the axial direction and in a direction perpendicular thereto for selectively focusing a real-size image and a varied-size image on said photosensitive member, wherein during real-size imaging the image of said positioning standard end is directed to said side end of said photosensitive member and during varied-size imaging the image thereof is shifted inwardly from said side end;

displacing means for displacing at least a portion of said optical means in the axial direction thereof and in a direction perpendicular thereto;

stopping means for terminating the displacement of said optical means;

switch means for deactivating said displacing means upon the lapse of a predetermined time after displacement of said optical means is stopped by said stopping means;

an exposure control mechanism for said focusing element and movable integrally therewith;

a control mechanism consisting of a movable portion connected for movement with the displacement of said focusing element and a fixed portion independent of said displacement, said mechanism being adapted to automatically control said exposure control mechanism in cooperation with the displacement of said movable portion in accordance with the change of the image magnification ratio; and an exposure adjust mechanism for controlling, by external manual operation, said exposure control mechanism through said control mechanism thereby manually controlling the amount of light supplied to said focusing element.

13. A copier comprising:

original support means;

a photosensitive member;

optical means comprising a focusing element for real-size imaging and a varied-size imaging;

a displacing means for displacing at least a portion of said optical means;

an exposure control mechanism for said focusing element and movable integrally therewith;

a control mechanism consisting of a movable portion connected for movement with the displacement of said focusing element and a fixed portion independent of said displacement, said mechanism being adapted to automatically control said exposure control mechanism in cooperation with the displacement of said movable portion in accordance with the change of the image magnification ratio; and an exposure adjusting mechanism for controlling, by manual operation from outside, said exposure control mechanism through said control mechanism thereby manually controlling the amount of light supplied to said focusing element.

14. A copier according to claim 13 wherein said control mechanism comprises a movable pulley provided in said movable portion and adapted for controlling said exposure control mechanism, a fixed pulley provided in said fixed portion, a floating pulley having a different diameter from at least one of said movable pulley and fixed pulley and provided between said two pulleys and an endless string provided around said pulleys, said movable pulley being rotated by the displacement of said movable portion whereby the exposure control mechanism automatically controls the amount of light supplied to said focusing element.

15. A copier according to claim 13 wherein said control mechanism comprises a member transmitting a drive power from said exposure adjusting mechanism to said exposure control mechanism but not in the opposite direction by the self-locking of a worm gear and a worm wheel.

16. A copier comprising:

original support means;

a photosensitive member;

optical means comprising a focusing element for real-size imaging and a varied-size imaging;

a displacing means for displacing at least a portion of said optical means;

an exposure control mechanism for said focusing element and movable integrally therewith;

a control mechanism consisting of a movable portion connected for movement with the displacement of said focusing element and a fixed portion independent of said displacement, said mechanism being adapted to automatically control said exposure control mechanism in cooperation with the displacement of said movable portion in accordance with the change of the image magnification ratio.

17. A copier according to claim 16 wherein said control mechanism comprises a movable pulley provided in said movable portion and adapted for controlling said exposure control mechanism, a fixed pulley provided in said fixed portion, a floating pulley having a different diameter from at least one of said movable pulley and fixed pulley and provided between said two pulleys and an endless string provided around said pulleys, said movable pulley being rotated by the displacement of said movable portion whereby the exposure control mechanism automatically controls the amount of light supplied to said focusing element.

* * * * *

UNITED STATES PATENT AND TRADEMARK OFFICE
CERTIFICATE OF CORRECTION

PATENT NO. : 4,264,198

DATED : April 28, 1981

INVENTOR(S) : KOICHI MIYAMOTO

It is certified that error appears in the above-identified patent and that said Letters Patent is hereby corrected as shown below:

In the Abstract, line 6, "original an" should read --an original--;

Column 1, line 29, "dislaced" should read --displaced--;
line 64, "mode copying" should read --copying mode--;

Column 3, line 18, "a2' = (1/n2)f" should read --a2' = (1 + 1/n2)f--;

Column 4, line 40, "incompletiness" should read --incompleteness--;
line 60, "6d'" should read --6d--;
line 66, "6d'" should read --6d--;

Column 5, line 2, "6d'" should read --6d--;

Column 11, line 22, delete "to obtain".

Signed and Sealed this

*Twelfth* Day of *July 1983*

[SEAL]

*Attest:*

GERALD J. MOSSINGHOFF

*Attesting Officer* *Commissioner of Patents and Trademarks*